United States Patent
Contreras et al.

(10) Patent No.: US 8,116,032 B2
(45) Date of Patent: *Feb. 14, 2012

(54) PERPENDICULAR MAGNETIC RECORDING SYSTEM WITH AUXILIARY COIL AND CIRCUITRY FOR FAST SWITCHING OF WRITE POLE MAGNETIZATION

(75) Inventors: John Thomas Contreras, Palo Alto, CA (US); Manfred Ernst Schabes, Saratoga, CA (US); David John Seagle, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 466 days.

This patent is subject to a terminal disclaimer.

(21) Appl. No.: 12/419,281

(22) Filed: Apr. 6, 2009

(65) Prior Publication Data

US 2010/0254042 A1  Oct. 7, 2010

(51) Int. Cl.
*G11B 5/17* (2006.01)
(52) U.S. Cl. ......... 360/123.02; 360/123.06; 360/123.11; 360/123.04; 360/125.17; 360/125.3
(58) Field of Classification Search .................. None
See application file for complete search history.

(56) References Cited

U.S. PATENT DOCUMENTS

| | | | |
|---|---|---|---|
| 5,661,612 A | 8/1997 | Hasegawa et al. | |
| 5,869,988 A | 2/1999 | Jusuf et al. | |
| 6,219,193 B1 | 4/2001 | Janz | |
| 6,349,009 B1 | 2/2002 | Dakroub et al. | |
| 6,775,099 B2 | 8/2004 | Kuroda et al. | |
| 6,785,092 B2 | 8/2004 | Covington et al. | |
| 6,816,339 B1 | 11/2004 | Litvinov et al. | |
| 6,913,704 B2 | 7/2005 | Hsiao et al. | |
| 6,954,331 B2 | 10/2005 | Crawford et al. | |
| 7,002,775 B2 | 2/2006 | Hsu et al. | |
| 7,070,716 B2 | 7/2006 | Lam | |
| 7,072,142 B2 * | 7/2006 | Lam | 360/123.19 |
| 7,237,320 B2 | 7/2007 | Lam | |

(Continued)

FOREIGN PATENT DOCUMENTS

JP  59060722 A1  4/1984

(Continued)

OTHER PUBLICATIONS

J.G. Zhu et al., "Microwave assisted recording", IEEE Trans. Mag. (2008), pp. 125-131.

(Continued)

*Primary Examiner* — Kevin Bernatz
(74) *Attorney, Agent, or Firm* — Thomas R. Berthold

(57) ABSTRACT

A perpendicular magnetic recording system has a write head having a main coil (the write coil) and main pole (the write pole) that directs write flux in a direction perpendicular to the recording layer in the magnetic recording medium, and an auxiliary coil and auxiliary pole that injects magnetic flux into the write pole at an angle to the primary or perpendicular axis of the write pole. The additional flux from the auxiliary pole, which is injected non-parallel to the primary magnetization of the write pole, exerts a relatively large torque on the magnetization of the write pole, thereby facilitating magnetization reversal of the write pole. Electrical circuitry is connected to the main coil and the auxiliary coil to generate the auxiliary flux simultaneous with the switching of the magnetization of the write pole.

16 Claims, 13 Drawing Sheets

U.S. PATENT DOCUMENTS

| | | |
|---|---|---|
| 7,256,955 B2 | 8/2007 | Pokhil et al. |
| 7,397,633 B2 | 7/2008 | Xue et al. |
| 2002/0030928 A1 | 3/2002 | Hsiao et al. |
| 2003/0026040 A1* | 2/2003 | Covington et al. ........... 360/126 |
| 2006/0054699 A1 | 3/2006 | Osterweil |
| 2007/0253106 A1 | 11/2007 | Sato et al. |
| 2008/0112078 A1 | 5/2008 | Hsiao et al. |
| 2008/0112080 A1 | 5/2008 | Lengsfield et al. |
| 2008/0112087 A1 | 5/2008 | Clinton et al. |
| 2008/0117545 A1* | 5/2008 | Batra et al. ............... 360/125.01 |
| 2008/0137224 A1 | 6/2008 | Gao et al. |
| 2008/0151436 A1 | 6/2008 | Sato et al. |
| 2008/0186628 A1 | 8/2008 | Hsiao et al. |
| 2008/0273268 A1 | 11/2008 | Hsiao et al. |
| 2010/0296194 A1* | 11/2010 | Gubbins et al. .......... 360/125.43 |
| 2011/0051288 A1* | 3/2011 | Contreras et al. .......... 360/234.3 |

FOREIGN PATENT DOCUMENTS

| | | |
|---|---|---|
| JP | 2001202601 A1 | 7/2001 |
| JP | 2004227709 A1 | 8/2004 |

OTHER PUBLICATIONS

Kittel C., "On the Theory of Ferromagnetic Resonance Absorption", Phys. Rev. 73, p. 155-161 (1948).

* cited by examiner

PERPENDICULAR MAGNETIC RECORDING SYSTEM WITH AUXILIARY COIL AND CIRCUITRY FOR FAST SWITCHING OF WRITE POLE MAGNETIZATION

RELATED APPLICATION

This application is related to concurrently filed application Ser. No. 12/419,278 titled "PERPENDICULAR MAGNETIC RECORDING SYSTEM WITH HELICAL WRITE COIL AND AUXILIARY COIL FOR FAST SWITCHING OF WRITE POLE MAGNETIZATION".

BACKGROUND OF THE INVENTION

1. Field of the Invention

This invention relates generally to perpendicular magnetic recording systems, and more particularly to a system with fast switching of the magnetization direction of the perpendicular write head.

2. Description of the Related Art

Perpendicular magnetic recording, wherein the recorded bits are stored in a perpendicular or out-of-plane orientation in the recording layer, allows for ultra-high recording densities in magnetic recording hard disk drives. The write head must be able to write data not only at high bit-density but also at high data-rates. The write speed is particularly important in enterprise disk drives. However, the switching time for the main pole of the write head to switch from one magnetization direction to the other is a limiting factor as the data rate is increased. At high data-rates, the available magnetic flux from the write head, as seen by the recording layer on the disk, is dominated by the low-frequency flux output of the write head. The reason for such loss of write flux includes a slow intrinsic time-constant of the magnetization reversal in the main pole of the write head. Also, lower data-rate systems still require additional overshoot of the write current from the disk drive's write driver circuitry to aid in the magnetization reversal. This additional overshoot requires additional power from the write driver circuitry.

Perpendicular magnetic recording systems with high-frequency assisted writing have been proposed, as described in U.S. Pat. No. 6,816,339 B1 and U.S. Pat. No. 7,256,955 B2. In these proposed systems, the write coil generates the main perpendicular write field as well as a high-frequency auxiliary field. The auxiliary field has a frequency close to the resonance frequency of the magnetic grains in the recording layer to facilitate the switching of the magnetization of the grains. US 2007/0253106 A1 describes a high-frequency assisted writing system where an auxiliary coil is used to apply the high-frequency auxiliary field to the magnetic grains of the recording layer.

Thus for both high data-rate and lower data-rate perpendicular magnetic recording, what is needed is a write head and system that reduces the magnetization reversal time of the main pole and overshoot for the main pole without the application of a high-frequency auxiliary field to the recording layer.

SUMMARY OF THE INVENTION

The invention relates to a perpendicular magnetic recording system with a write head having a main coil (the write coil) and main pole (the write pole) that directs write flux in a direction perpendicular to the recording layer in the magnetic recording medium, and an auxiliary coil and auxiliary pole that injects magnetic flux into the write pole at an angle to the primary or perpendicular axis of the write pole. The additional flux from the auxiliary pole, which is injected non-parallel to the primary magnetization of the write pole, exerts a relatively large torque on the magnetization of the write pole, thereby facilitating magnetization reversal of the write pole. The auxiliary pole has its longitudinal axis oriented at an angle (greater than 15 degrees) and preferably substantially orthogonal (70 to 90 degrees) to the primary or perpendicular axis of the write pole.

Electrical circuitry is connected to the main coil and the auxiliary coil to generate the auxiliary flux simultaneous with the switching of the magnetization of the write pole. In one embodiment the electrical circuitry includes the write driver circuitry that generates the write signal to the write coil, and an oscillator connected to the write driver circuitry and coupled to the auxiliary coil. The oscillator provides a high-frequency signal, preferably higher than the frequency of the write signal from the write driver, to the auxiliary coil. The phase of the oscillator is controlled with respect to the phase of the write signal so that the auxiliary coil generates the auxiliary flux in phase with the switching of the write current from the write coil. In another embodiment the electrical circuitry includes a high-pass filter coupled to the connection between the write driver circuitry and the write coil. The high-pass filtered signal of the write signal is used to energize the auxiliary coil and create the auxiliary flux. When the write signal switches the direction of write current, the high-pass filter passes high-frequency components which are directed to the auxiliary coil to create the auxiliary flux. The high-frequency components are generated by the high-pass transitions of the write current.

The current to the auxiliary coil preferably has a magnitude at least about 20% of the magnitude of the write current. The frequency of the signal to the auxiliary coil is preferably greater than the maximum write frequency, and preferably close to the ferromagnetic resonance frequency of the magnetic material of the write pole. Ferromagnetic resonance arises from the precessional motion of the magnetic material of the write pole in the presence of the auxiliary magnetic field from the auxiliary coil. The auxiliary magnetic field puts a torque on the magnetization of the magnetic material of the write pole which causes the magnetic moment to precess. However, auxiliary fields with frequencies lower than the ferromagnetic resonance frequency will also contribute to the switching of the magnetization of the write pole when applied at appreciable angles relative to the main direction of the magnetic anisotropy of the write pole. If the auxiliary field is at a frequency less than the ferromagnetic resonance frequency, the beneficial effect of the auxiliary field on the switching of the magnetization of the write pole will be dominated by the increase of the magnetic reversal torque in proportion to $\sin(\theta)$, where $\theta$ is the angle between the local direction of the total field from the main and auxiliary coils and the local direction of the magnetization of the write pole.

For a fuller understanding of the nature and advantages of the present invention, reference should be made to the following detailed description taken together with the accompanying figures.

DETAILED DESCRIPTION OF THE INVENTION

Figure 1:
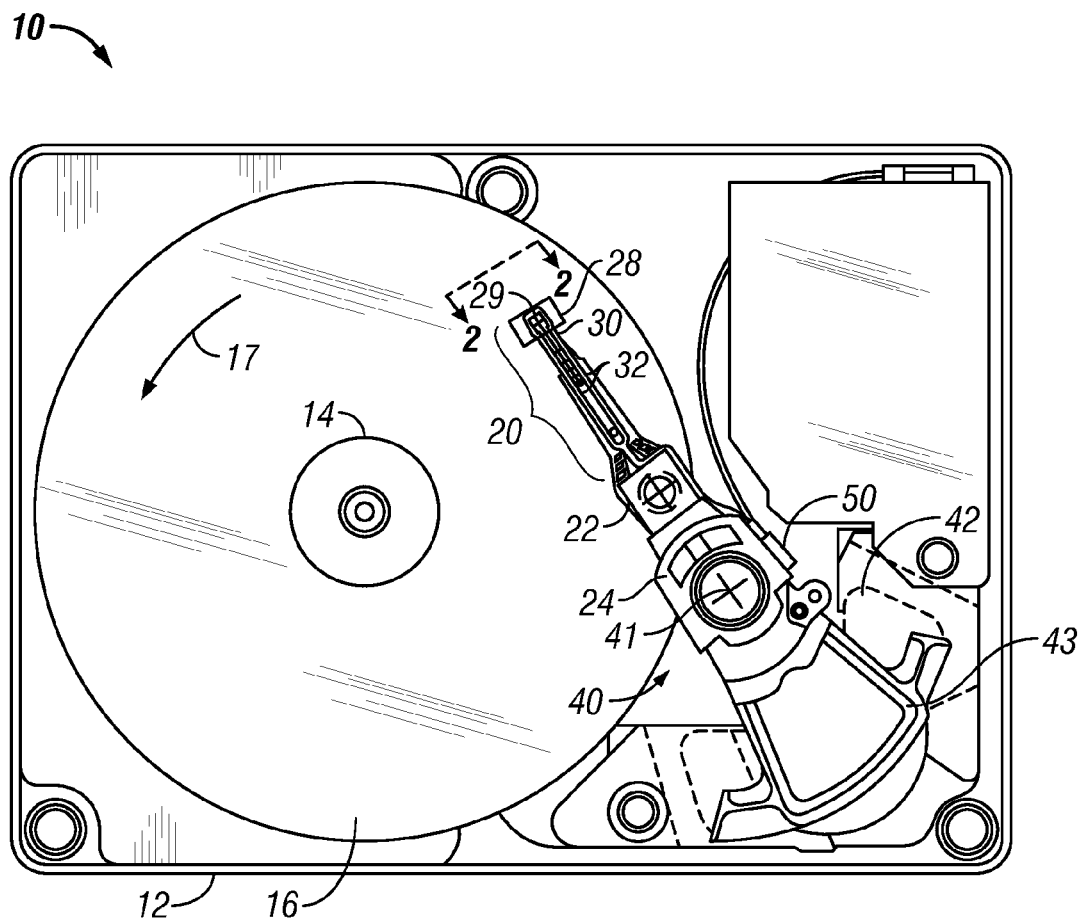
FIG. 1 is a top plan view of a head/disk assembly of a hard disk drive.

FIG. 1 is a top plan view of a head/disk assembly of a hard disk drive 10 with the cover removed. The disk drive 10 includes a rigid base 12 supporting a spindle 14 that supports a stack of disks, including top disk 16. The spindle 14 is rotated by a spindle motor (not shown) for rotating the disks in the direction shown by curved arrow 17. The hard disk drive 10 has at least one load beam assembly 20 having an integrated lead suspension (ILS) or flexure 30 with an array 32 of electrically conductive interconnect traces or lines. The load beam assemblies 20 are attached to rigid arms 22 connected to an E-shaped support structure, sometimes called an E-block 24. Each flexure 30 is attached to an air-bearing slider 28. A magnetic recording read/write head 29 is located at the end or trailing surface 25 of slider 28. The flexure 30 enables the slider 28 to "pitch" and "roll" on an air-bearing generated by the rotating disk 16. Disk drive 10 also includes a rotary actuator assembly 40 rotationally mounted to the rigid base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the read/write heads 29 to the data tracks on the disks. The trace interconnect array 32 connects at one end to the read/write head 29 and at its other end to read/write circuitry contained in an electrical module or chip 50 secured to a side of the E-block 24. The chip 50 includes a read preamplifier and a write driver circuit.

Figure 2:
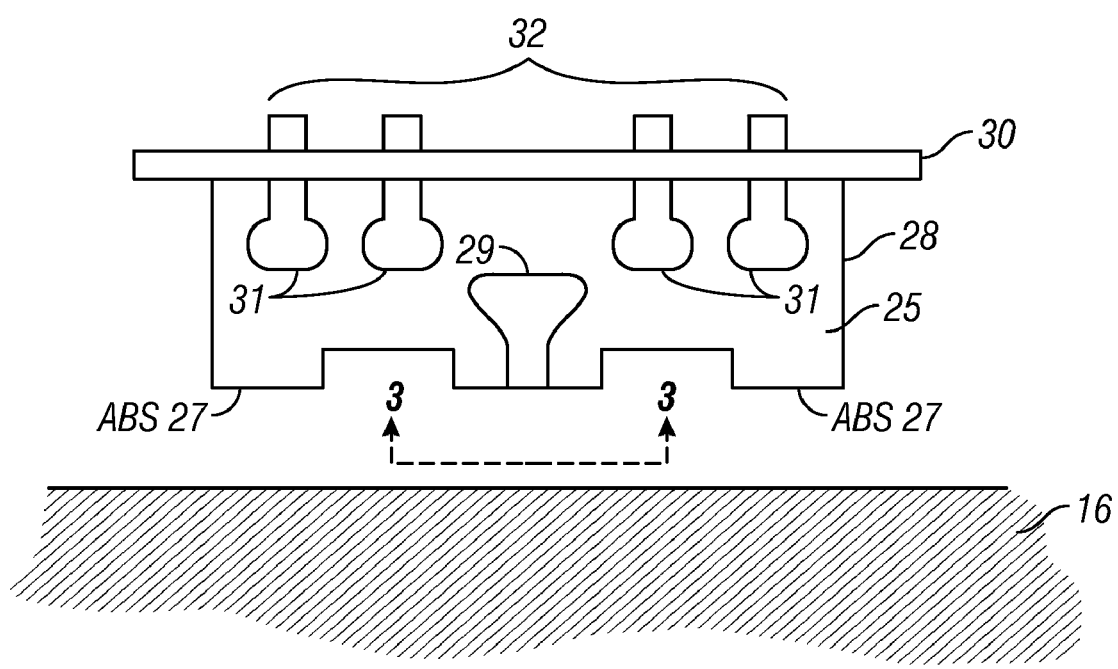
FIG. 2 is an enlarged end view of the slider and a section of the disk taken in the direction 2-2 in FIG. 1.

FIG. 2 is an enlarged end view of the slider 28 and a section of the disk 16 taken in the direction 2-2 in FIG. 1. The slider 28 is attached to flexure 30 and has an air-bearing surface (ABS) 27 facing the disk 16 and an end or trailing surface 25 generally perpendicular to the ABS 27. The ABS 27 causes the airflow from the rotating disk 16 to generate a bearing of air that supports the slider 28 in very close proximity to or near contact with the surface of disk 16. The read/write head 29 is formed as a series of thin films deposited on the slider 28 on its trailing surface 25. Typically a layer of insulating material, like alumina, is deposited over the read/write head 29 and serves as the outer surface of slider 28. The read/write head 29 is connected to terminal pads 31. The terminal pads 31 connect to the trace array 32 on flexure 30 for electrical connection to the read preamplifier and write driver in chip 50 (FIG. 1).

Figure 3:
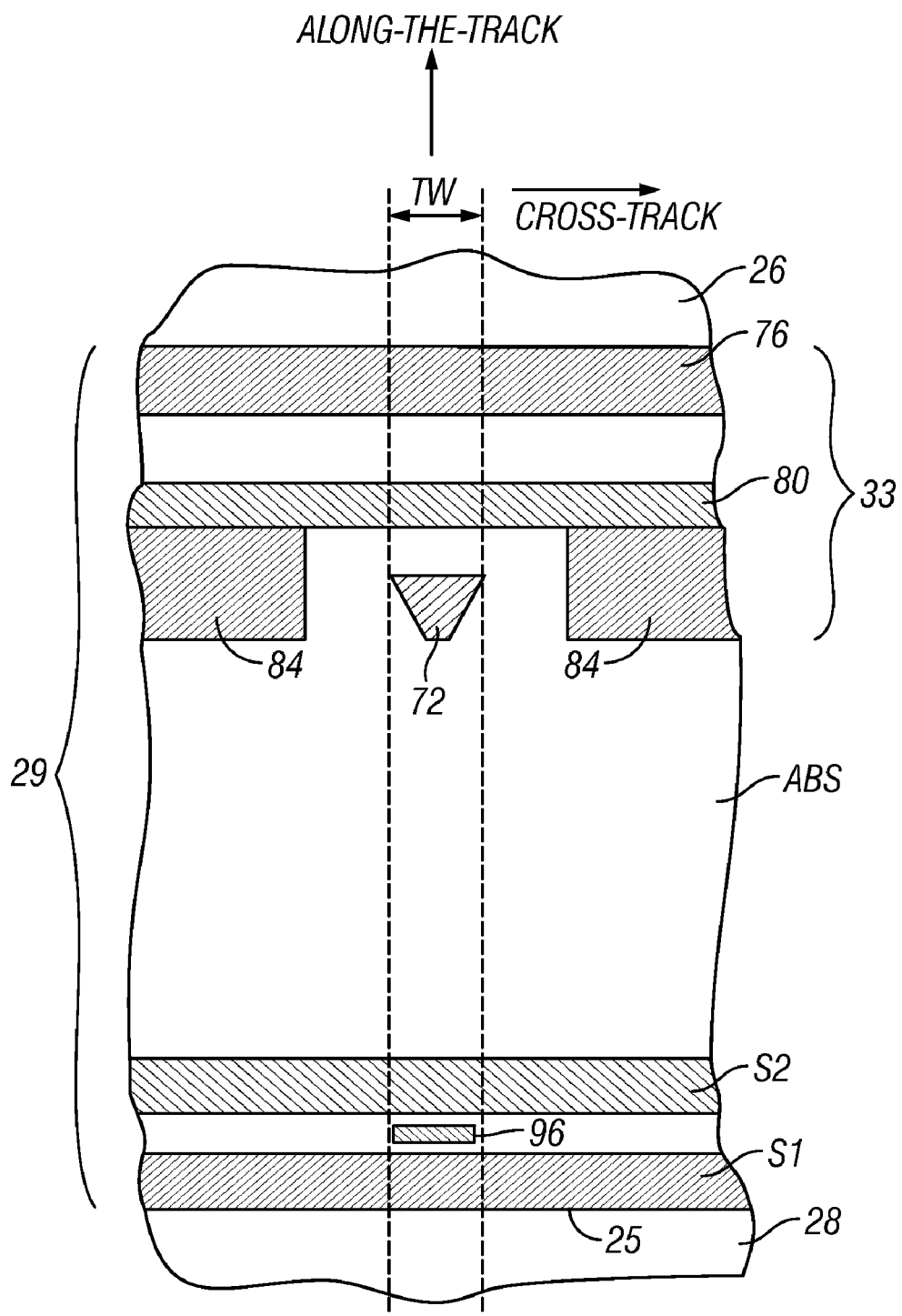
FIG. 3 is a view in the direction 3-3 of FIG. 2 and shows the ends of the read/write head as viewed from the disk.

FIG. 3 is a view in the direction 3-3 of FIG. 2 and shows the ends of read/write head 29 as viewed from the disk 16. The read/write head 29 includes a read head 96 and a write head 33 that are formed as a series of thin films deposited and lithographically patterned on the trailing surface 25 of slider 28, with the films of the read head being deposited first and the films of the write head being deposited over the read head. The magnetoresistive read sensor or head 96 is located between two magnetic shields S1 and S2, with first shield S1 being located on trailing surface 25. The write head 33 has a perpendicular write head and includes magnetic write pole (WP) with WP tip 72 and flux return pole 76. The WP tip 72 may be generally surrounded at the ABS by optional side shields 84 and trailing shield 80. The trailing shield 80 and side shields 84 may be connected to form a wraparound shield (WAS). The WAS is described in detail as a shield for a conventional perpendicular recording head in U.S. Pat. No. 7,002,775 B2 assigned to the same assignee as this application. The WAS, which is separated from the WP tip 72 by nonmagnetic gap material, alters the angle of the write field and improves the write field gradient at the point of writing, and also shields the writing field at regions of the disk away from the track being written. The shields S1, S2 for the read head 96 and the shields 80, 84 for the WP tip 72 are formed of magnetically permeable material. A layer of insulating material, like alumina, is deposited over the write head 33, resulting in an outer surface 26. The width of the WP tip 72 and the read head 96 in the cross-track direction correspond generally to the trackwidth (TW) of the data tracks on the disk 16.

Figure 4B:
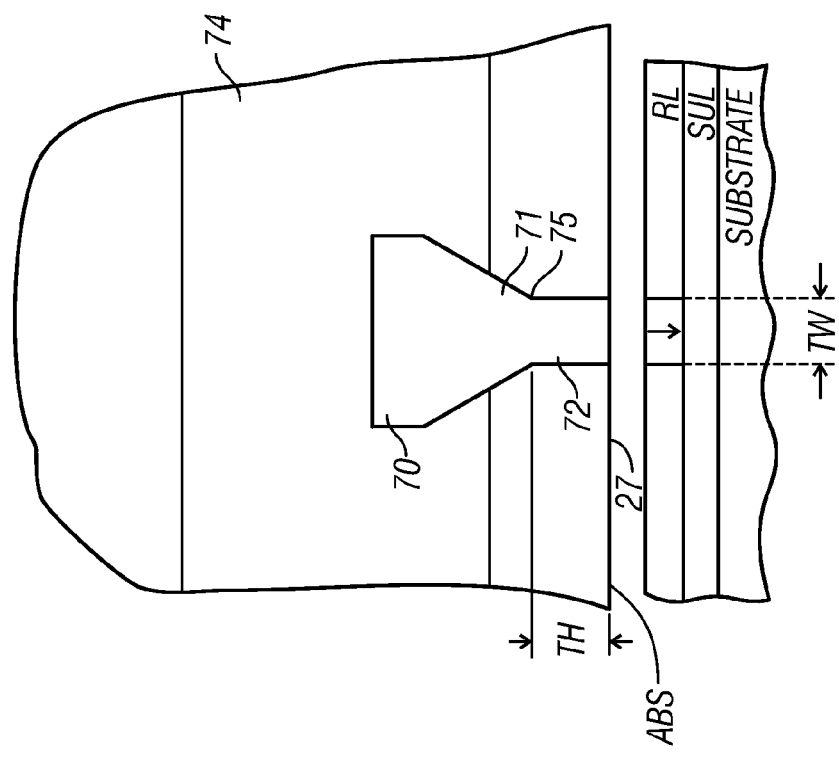
FIG. 4B is a view in the direction 4B-4B of FIG. 4A and illustrates the flare region of the flared write pole for the perpendicular write head.
Figure 4A:
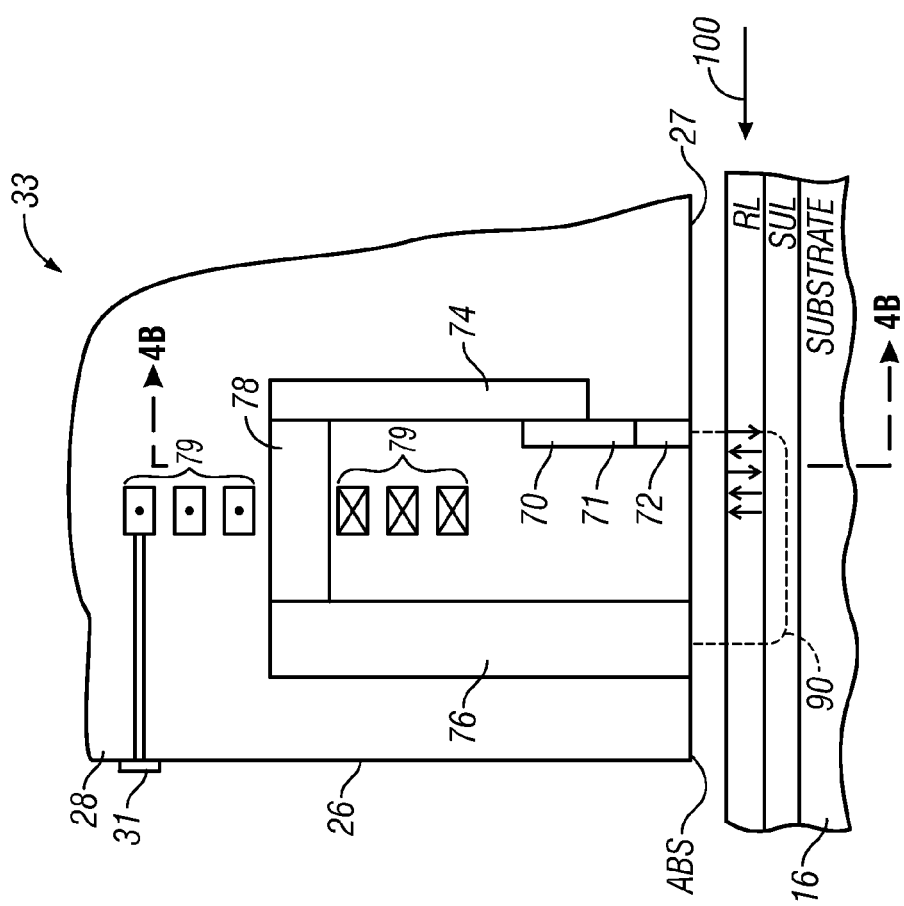
FIG. 4A is a sectional view of a portion of a slider showing a prior art perpendicular write head with a pancake coil according and a portion of a perpendicular magnetic recording disk.

FIG. 4A is a sectional view of a portion of slider 28 showing the perpendicular write head 33 and a portion of a perpendicular magnetic recording disk 16. The disk 16 includes a perpendicular magnetic data recording layer (RL) on a "soft" or relatively low-coercivity magnetically permeable underlayer (SUL) formed on the disk substrate. The write head 33 includes a yoke made up of the main pole 74, flux return pole 76, and yoke stud 78 connecting the main pole 74 and flux return pole 76; and a thin film "pancake" coil 79 shown as sections wrapped around yoke stud 78. The return pole 76 and yoke stud 78 are formed of soft ferromagnetic material, such as alloys of NiFe, CoFe and NiFeCo that are typically formed by electroplating. The write head 33 in FIG. 4A is depicted without the optional WAS (FIG. 3). The coil 79 is connected to terminals, such as terminal 31, on the outer surface 26 of slider 28. A flared write pole (WP) 70 is part of the main pole 74 and has a flared portion 71 and a pole tip 72 that faces the surface of disk 16. The WP 70 is formed of a high-moment material, such as a high-moment CoFe alloy, that is typically formed by sputter deposition, and may be a laminated structure. Write current through the thin film coil 79 induces a magnetic field (shown by dashed line 90) from the flared WP 70 that passes through the data RL (to magnetize the region of the RL beneath the WP 70), through the flux return path provided by the SUL, and back to the return pole 76. The slider 28 has its air-bearing surface (ABS) 27 supported above the surface of disk 16 as the disk 16 moves past the write head 33 in the direction indicated by arrow 100. The RL is illustrated with a perpendicularly recorded or magnetized region representing data adjacent to the pole tip 72. Preceding regions are shown having random prerecorded magnetization directions, as represented by the arrows. The magnetic transitions are detectable by the read head (not shown in FIG. 4A) as the recorded bits. The write coil 79 is called a "pancake" coil because it is deposited and patterned on the trailing end of the slider as essentially a single layer and thus all of the coil turns lie in substantially the same plane. When write current from the write driver in chip 50 (FIG. 1) is directed to coil 79 in one direction, for example in FIG. 4A out of the paper in the upper coil sections 79 with dots and into the paper in the lower coil sections 79 with the Xs, the region of the RL beneath the WP tip 72 is magnetized in one direction, down or into the disk in FIG. 4A. When the write driver switches the direction of the write current to coil 79, the region of the RL beneath the WP tip 72 is magnetized in the opposite direction, i.e., up or out of the disk in FIG. 4A.

FIG. 4B is a view in the direction 4B-4B of FIG. 4A and illustrates the flare region 71 of the flared WP 70. The region between the WP tip 72 and the flare portion 71 is called the flare point 75. The flare point 75 of the WP 70 is sometimes referred to as the "choke" point because it is the point where the flux density is highest and where the WP 70 saturates. The WP tip 72 has its primary or perpendicular axis oriented perpendicular to the ABS and has a "height" or distance from the ABS to flare point 75 called the throat height (TH). As shown in FIG. 4B, the two side walls of WP tip 72 define its width in the cross-track direction, which substantially defines the trackwidth (TW) of the data recorded in the RL of disk 16.

Figure 5:
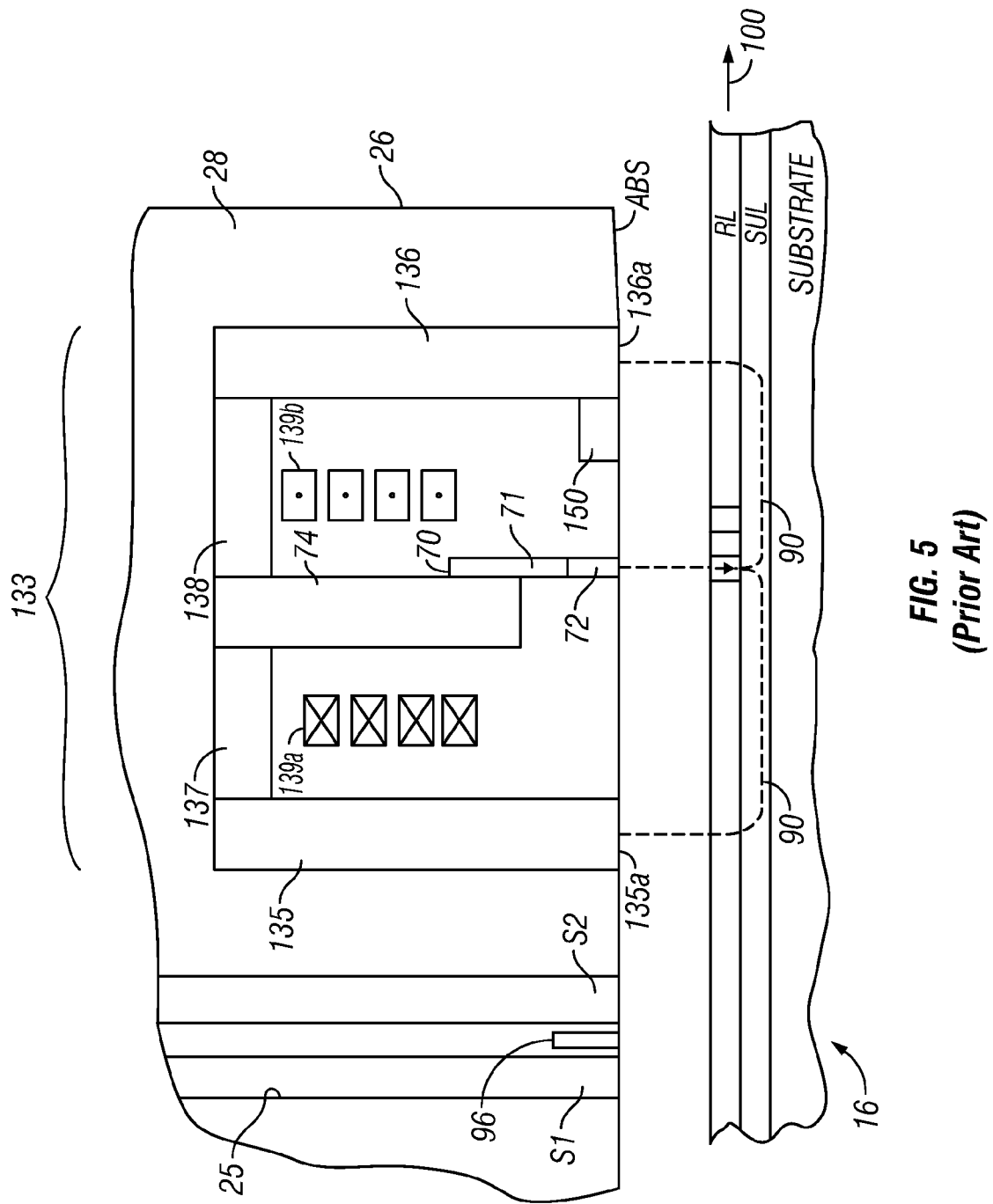
FIG. 5 is a side sectional view of a portion of a slider showing a read head, a prior art perpendicular write head with a helical coil, and a perpendicular magnetic recording disk.

The perpendicular write head of FIG. 4A has a "pancake" coil 79. FIG. 5 shows slider 28 with trailing surface 25, outer surface 26 and a read head 96 between shields S1, S2 like that in FIGS. 4A-4B, but wherein the perpendicular write head 133 has a thin film "helical" coil (shown with coil sections 139a, 139b) wrapped around the main pole 74. A perpendicular write head with a helical coil is described in US 2008/0186628 A1 assigned to the same assignee as this application. The write head 133 is formed on slider 28 having an outer surface 26 and also includes a yoke made up of the main pole 74, a shield layer 135, and connection stud 137 to the main pole 74. Pole 136 is the return path for the magnetic flux 90 and is connected to trailing shield 150, which may be part of a WAS. Return pole 136 has a yoke stud 138 that connects the return pole 136 to the main pole 74. A flared WP 70 is part of the main pole 74 and has a flared portion 71 and a WP tip 72 like that shown in FIGS. 4A-4B. Write current through coil 139a, 139b induces a magnetic field (shown by dashed line 90) from the WP 70 that passes through the RL (to magnetize the region of the RL beneath the WP tip 72), through the flux return path provided by the SUL, and back to the return pole 136. The end of WP tip 72 is located substantially at the ABS, and the return pole 136 has an end 136a that is located substantially at the ABS and thus generally coplanar with end WP tip 72.

Figure 6A:
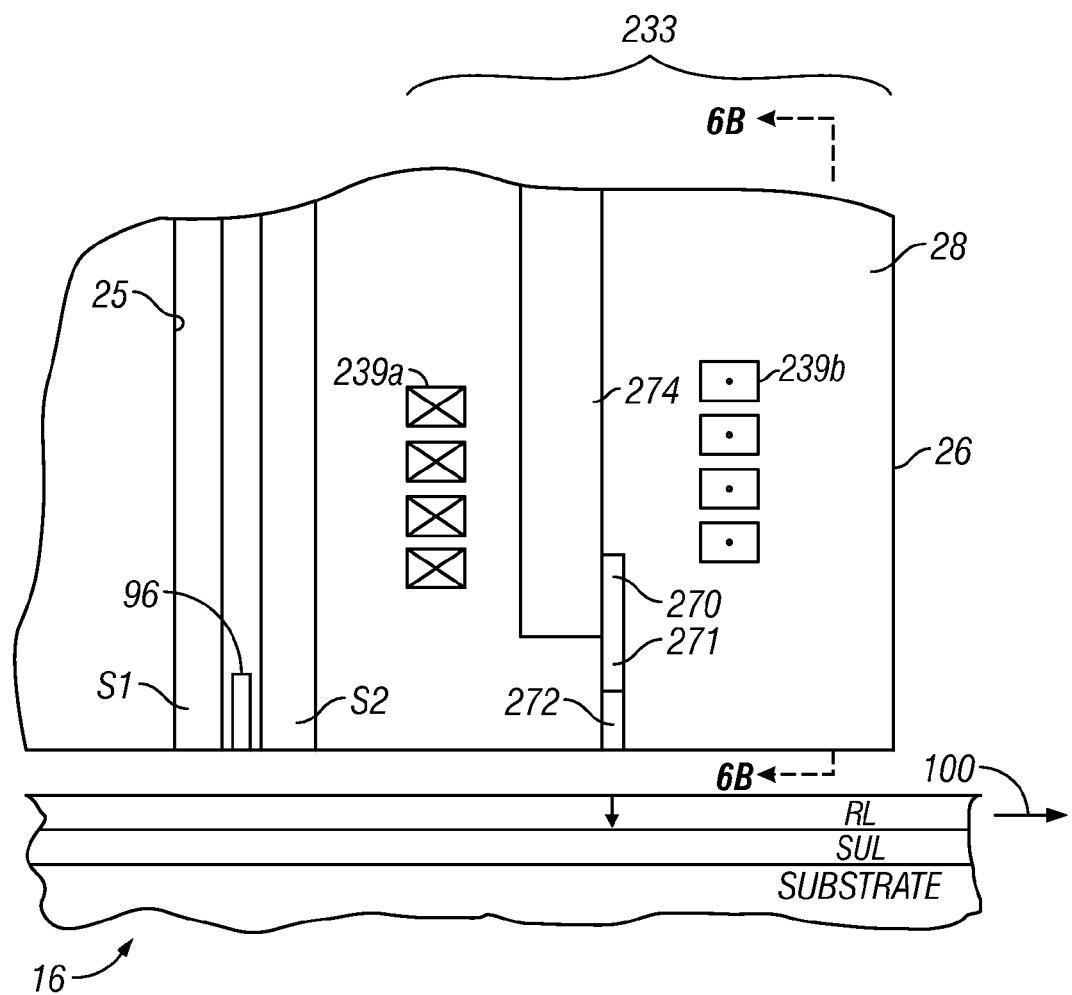
FIG. 6A is a side sectional view of a portion of a slider with a planar perpendicular write head with a helical coil taken through a plane parallel to a data track.

FIG. 6A is a side sectional view showing slider 28 with trailing surface 25, outer surface 26 and a read head 96 between shields S1, S2 like that in FIG. 5, but wherein the perpendicular write head 233 is a "planar" write head with a thin film "helical" coil (shown with coil sections 239a, 239b) wrapped around the main pole 274. FIG. 6A shows a first set of coil segments 239a, the main pole 274 and connected WP 270, and a second set of coil segments 239b. In FIG. 6A the flux return path is not visible, unlike item 90 in FIG. 5, because the return poles are substantially coplanar with main pole 274.

Figure 6B:
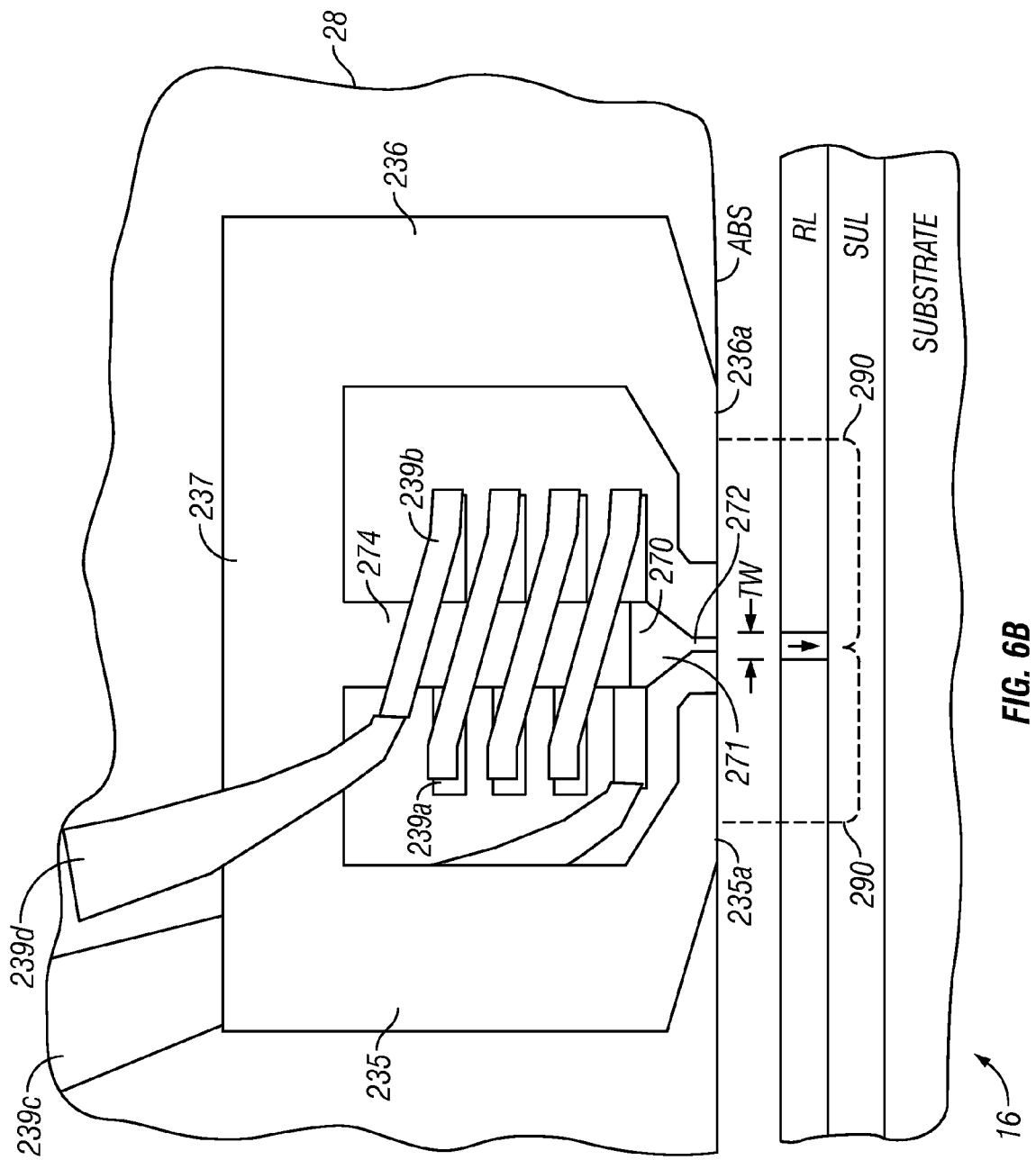
FIG. 6B is a view in the direction 6B-6B of FIG. 6A and illustrates the coplanar main pole and return poles of the perpendicular write head of FIG. 6A.

FIG. 6B is a view in the direction 6B-6B of FIG. 6A. The main pole 274, first return pole 235, second return pole 236 and connecting stud 237 are all formed as a single continuous layer. The return poles 235, 236 are spaced on opposite sides of main pole 274 in the cross-track direction. FIG. 6B also illustrates the two sets of coil segments 239a, 239b. The first coil segments 239a are formed before the main pole and return poles and the second coil segments 239b are formed after the main pole and return poles. The two sets of coil segments 239a, 239b are then connected at their ends to form the helical coil that is wrapped around the main pole 274. Write current to and from leads 239c, 239d travels in a helical path around the main pole 274. Depending on the direction of current, a magnetic field is induced in one of two directions from WP 270 generally perpendicular to the RL. For example, in FIG. 6B the coil is wrapped in a direction such that write current in from lead 239c and out through lead 239d would induce a magnetic field perpendicularly toward the RL, as shown by the direction of the arrow in RL just beneath the end of WP tip 272. The return poles 235, 236 may optionally have ends 235a, 236a, respectively, that are tapered toward the end of WP tip 272. This results in the return pole end faces 235a, 236a being located closer to the main pole 274 than the return pole regions recessed from the ABS and facilitates the flux return path 290 while still providing space for formation of the coil segments 239a, 239b. The planar perpendicular write head with helical coil shown in FIGS. 6A-6B is described in pending application Ser. No. 11/743,150 filed May 2, 2007, published as US 2008/0273268 A1, and assigned to the same assignee as this application.

Figure 7A:
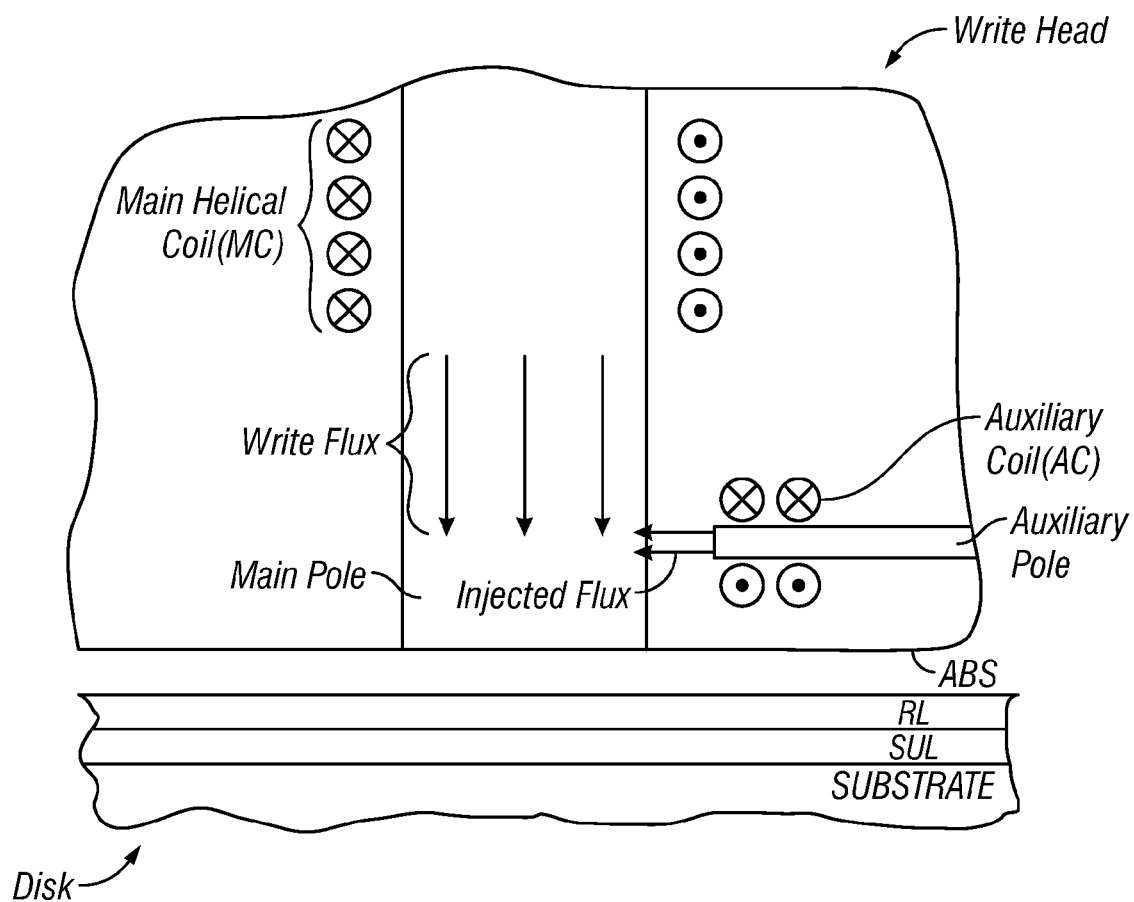
FIG. 7A is a schematic illustrating the basic concept of the invention showing a main coil (MC) with main pole and auxiliary coil (AC) with auxiliary pole oriented substantially orthogonal to the main pole.

In this invention an auxiliary pole with auxiliary coil is used to inject magnetic flux into the main pole at an angle, preferably substantially orthogonal, to the primary axis of the main pole. The write flux from the main pole flows in a direction perpendicular to the ABS, either toward or away from the RL, depending on the direction of write current in the main coil. The additional flux from the auxiliary pole, which is injected non-parallel to the primary magnetization of the main pole, exerts a relatively large torque on the magnetization of the main pole, thereby facilitating magnetization reversal of the main pole. The basic concept of the invention is shown in FIG. 7A, which illustrates the main coil (MC) and main pole with write flux directed perpendicular to the RL of the disk and the auxiliary coil (AC) and auxiliary pole with auxiliary flux directed at an angle (greater than 15 degrees) and preferably substantially orthogonal (70 to 90 degrees) to the main pole.

Figure 7B:
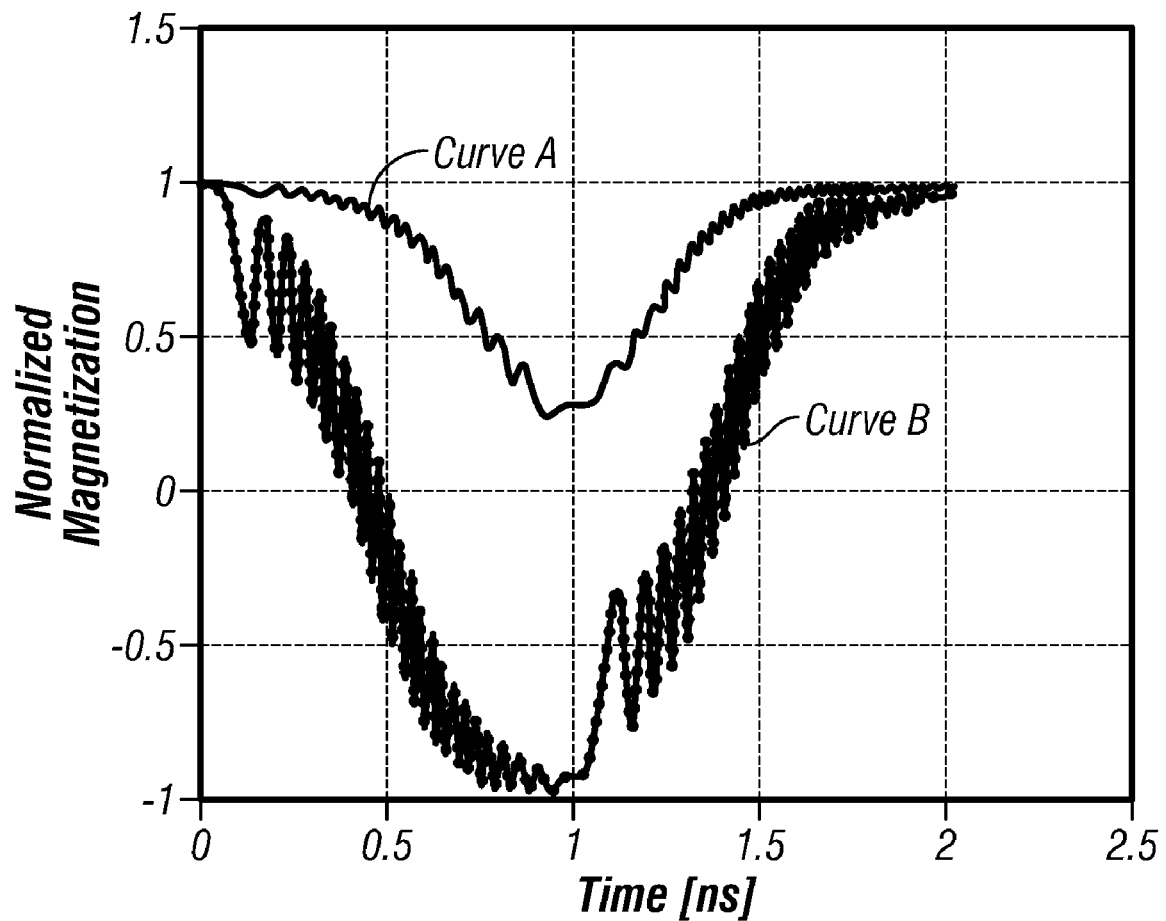
FIG. 7B is a graph of a computer-generated micromagnetic simulation of the magnetization reversal of a cylindrical magnetic nanostructure representing the write pole with (Curve B) and without (Curve A) an auxiliary orthogonal field.

A computer simulation has established that the time required for flux reversal in the main pole, which directly relates to data rate performance, is significantly reduced with this invention. This reduced switching time, or increased write head switching speed, thus allows for a disk drive with an increased data rate. FIG. 7B shows the computer-generated micromagnetic simulation of the magnetization reversal of a cylindrical magnetic nanostructure representing the write pole. The nanostructure has a diameter D=8 nm and a height h=10 nm. At time t=0, the nanostructure has a normalized magnetization of +1. Curve A shows the attempt to reverse the magnetization to −1 by applying a field parallel to the height of the nanostructure at a frequency of 0.5 GHz. As shown by Curve A, the magnetization is not switched but only reduced to about +0.3 after about 1 ns. Curve B shows the result when the same parallel field is applied together with an auxiliary field orthogonal to the height of the nanostructure. The orthogonal auxiliary field had an amplitude equal to 20% of the amplitude of the parallel field and was applied at a frequency of 1.0 GHz, twice the frequency of the parallel field.

As shown by Curve B the magnetization is completely switched to −1 after about 0.8 ns. Additional simulations at different frequencies for the auxiliary orthogonal field show that higher frequencies improve the switching time even further. For example at a frequency of 6.5 GHz for the auxiliary orthogonal field, the magnetization is switched to −1 in about 0.5 ns.

Thus it has been determined that switching of the write pole magnetization benefits from the application of an orthogonal auxiliary magnetic field with the improvement depending on the frequency of the auxiliary field. As is well known in the art, ferromagnetic materials absorb applied magnetic fields more efficiently at or near their ferromagnetic resonance frequency [Kittel C., "On the Theory of Ferromagnetic Resonance Absorption", *Phys. Rev.* 73, p. 155-161 (1948)]. Accordingly, the frequency of the auxiliary magnetic field from the auxiliary coil can be selected to be preferably within a range near the ferromagnetic resonance of the magnetic material making up the write pole, which generally implies a frequency higher than the frequency of the main write field. Ferromagnetic resonance arises from the precessional motion of the magnetic material of the write pole in the presence of the auxiliary magnetic field from the auxiliary coil. The auxiliary magnetic field puts a torque on the magnetization of the magnetic material of the write pole which causes the magnetic moment to precess. The resonant frequency of the ferromagnetic precession depends on the material properties, including magnetic anisotropy and moment density and the shape of the magnetic structure. For example, for material used as write poles in conventional disk drive write heads, the ferromagnetic resonance frequency is typically in the range of 1-4 GHz. However, auxiliary fields with frequencies lower than the ferromagnetic resonance frequency will also contribute to the switching of the magnetization of the write pole when applied at appreciable angles relative to the main direction of the magnetic anisotropy of the write pole. If the auxiliary field is at a frequency less than the ferromagnetic resonance frequency, the beneficial effect of the auxiliary field on the switching of the magnetization of the write pole will be dominated by the increase of the magnetic reversal torque in proportion to $\sin(\theta)$, where $\theta$ is the angle between the local direction of the total field from the main and auxiliary coils and the local direction of the magnetization of the write pole. The proportionality of the magnetic torque to $\sin(\theta)$ also explains why the auxiliary field is useful not only at angles of 90 degrees but at lesser angles, preferably in the range of 15 to 90 degrees, relative to the write pole.

Figure 8A:
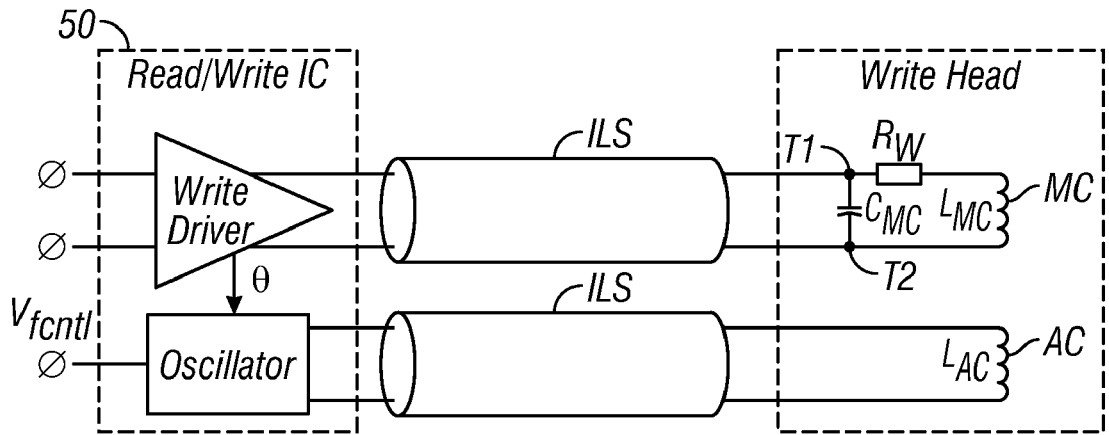
FIG. 8A shows an embodiment of the electrical circuitry connected to the main coil (MC) and the auxiliary coil (AC) with a separate oscillator signal source and separate interconnect lines.

FIG. 8A shows an embodiment of the electrical circuitry connected to the main coil (MC) and the auxiliary coil (AC) to generate the auxiliary flux simultaneous with the switching of the magnetization of the main pole. The write driver circuitry is in the read/write integrated circuit of chip 50 (FIG. 1) that is located away from the slider, typically on the E-block 24 (FIG. 1). The write driver is connected via interconnect lines on the integrated lead suspension (ILS) to the MC at terminals T1, T2. The write head has a resistance $R_w$, the MC has an inductance $L_{MC}$, and the term $C_{MC}$ represents the parasitic capacitance. In the embodiment of FIG. 8A, an oscillator is also located in the circuitry of chip 50 as an independent signal source for the auxiliary coil (AC) with inductance $L_{AC}$. The oscillator is connected to the AC via interconnect lines separate from the interconnect lines between the write driver and the MC, but also located on the ILS. The oscillator provides the high-frequency signal (higher than the frequency of the write signal from the write driver) to the AC. The frequency of the oscillator is controlled by the voltage ($V_{fcnt1}$). The phase ($\theta$) of the oscillator is controlled with respect to the phase of the write signal so that the AC generates the auxiliary flux in phase with the switching of the write current from the MC. The independent signal source for the auxiliary current with phase matched to the phase of the write signal can be accomplished with use of a conventional phase-locked-loop (PLL) and voltage-controlled oscillator (VCO).

Figure 8B:
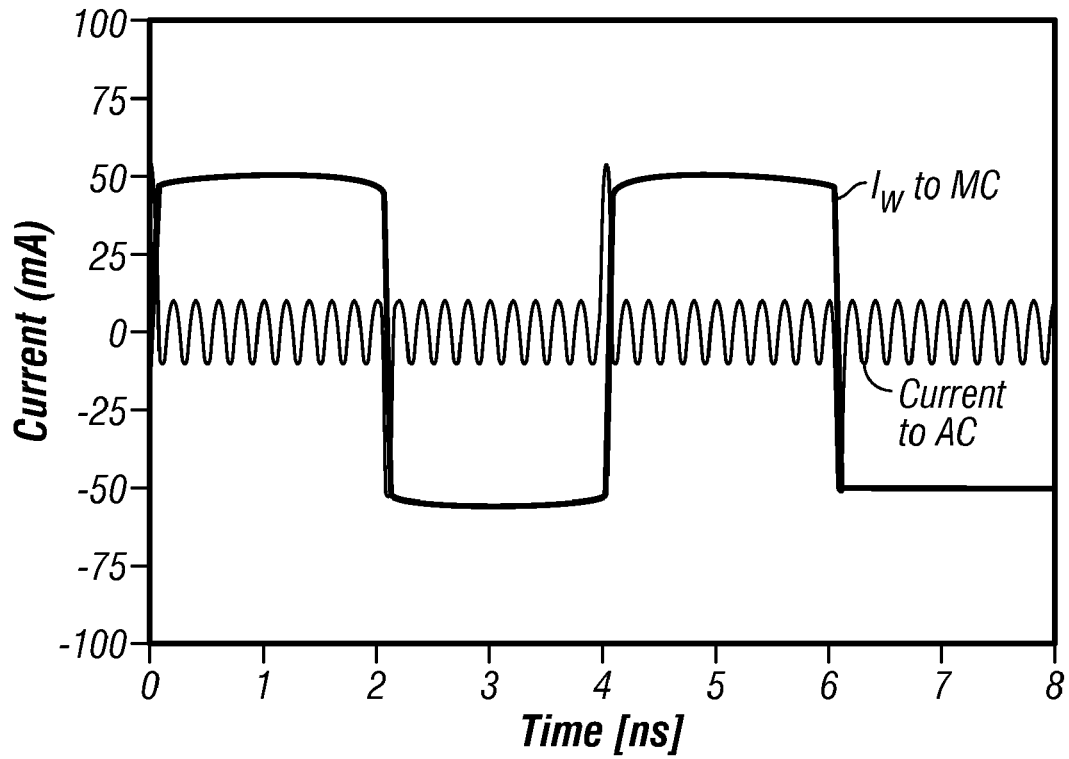
FIG. 8B is a graph of the write current ($I_w$) to the MC and the auxiliary current to the AC as a function of time for the circuitry embodiment of FIG. 8A.

FIG. 8B is a graph of the write current ($I_w$) to the MC and the auxiliary current to the AC as a function of time. In this example, the write current is depicted as switching from +50 mA to −50 mA at a frequency of 250 MHz, which corresponds to a maximum data rate of 500 Mb/sec. The auxiliary current should have a frequency greater than the maximum write frequency, preferably close to the ferromagnetic resonance frequency of the magnetic material of the write pole. The auxiliary current should have a magnitude at least about 20% of the magnitude of the write current. For example, in FIG. 8B the auxiliary signal is at a frequency about 12 times the frequency of the write signal with a signal amplitude of about 20% the amplitude of the write signal and thus switches the current in the AC from +10 mA to −10 mA.

Figure 9A:
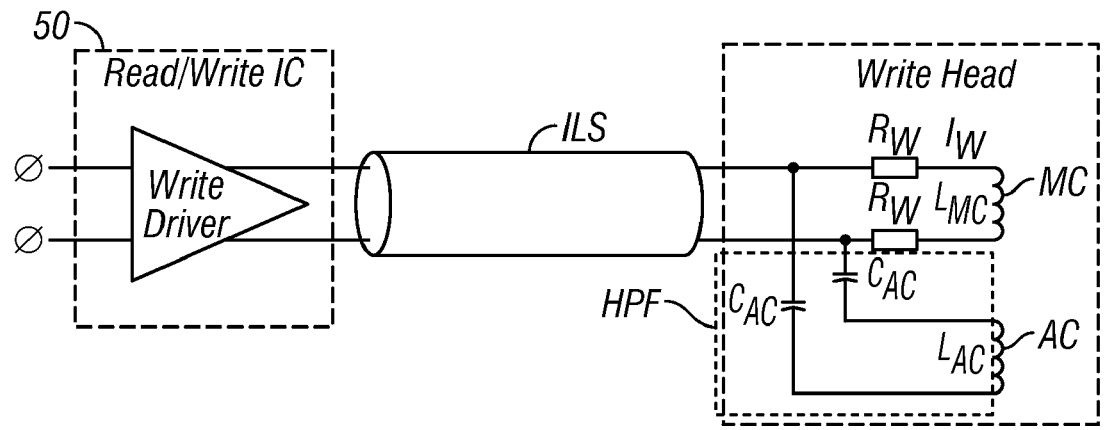
FIG. 9A shows an embodiment of the electrical circuitry connected to the MC and the AC that does not require an oscillator as a separate signal source and separate interconnect lines.
Figure 9B:
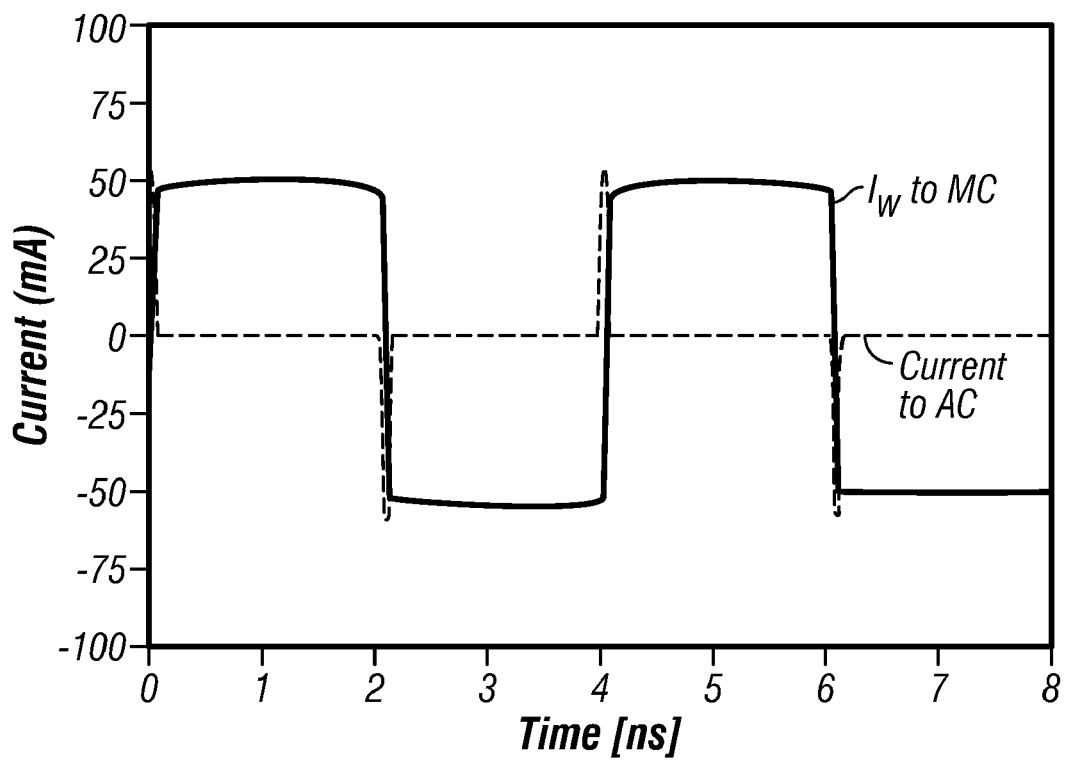
FIG. 9B is a graph of the write current ($I_w$) to the MC and the auxiliary current to the AC as a function of time for the circuitry embodiment of FIG. 9A.

FIG. 9A shows an embodiment of the electrical circuitry connected to the MC and the AC that does not require the oscillator as a separate signal source and separate interconnect lines. In this embodiment the high-pass filtered signal of the write signal is used to energize the AC and create the auxiliary flux. A pair of matched capacitors $C_{AC}$ are in series with the AC and serve as a high-pass filter (HPF) for the write signal from the write driver to the MC. The HPF is in parallel with the MC. In FIG. 9B $I_w$ is the write current to the MC and is shown with the current to the AC that is generated from the HPF. When the write signal switches the direction of write current, for example from positive to negative at 2 ns, the HPF passes high-frequency components which are directed to the AC to create the auxiliary flux. The high-frequency components are generated by the high-pass transitions of the write current. The following equation shows a calculation of the natural resonance frequency ($f_{HP}$) of the write signal, which is the high-pass of the HPF:

$$f_{HP} \approx \frac{1}{2\pi} \sqrt{\frac{2}{C_{AC}(L_{MC} + L_{AC})}}$$

Passive components can be formed on the slider to create the HPF and fabricated using the same materials and thin film processes as used to fabricate the read/write head on the slider. Resistors on the order of several Ohms to tens of kOhms can be fabricated from existing films with resistivity ranging from 0.01 Ohm/sq to 20 Ohms/sq. Capacitors ranging from a few femtoF to tens of picoF can be fabricated from alumina gaps ranging from 10 nm to several microns. Inductors up to tens of nanoH can be made from shield and pole material required for the read/write head. In addition, resistive passive components may be added in series with $L_{AC}$ and or $L_{MC}$ to aid in dampening the resonance of the HPF.

Figure 10A:
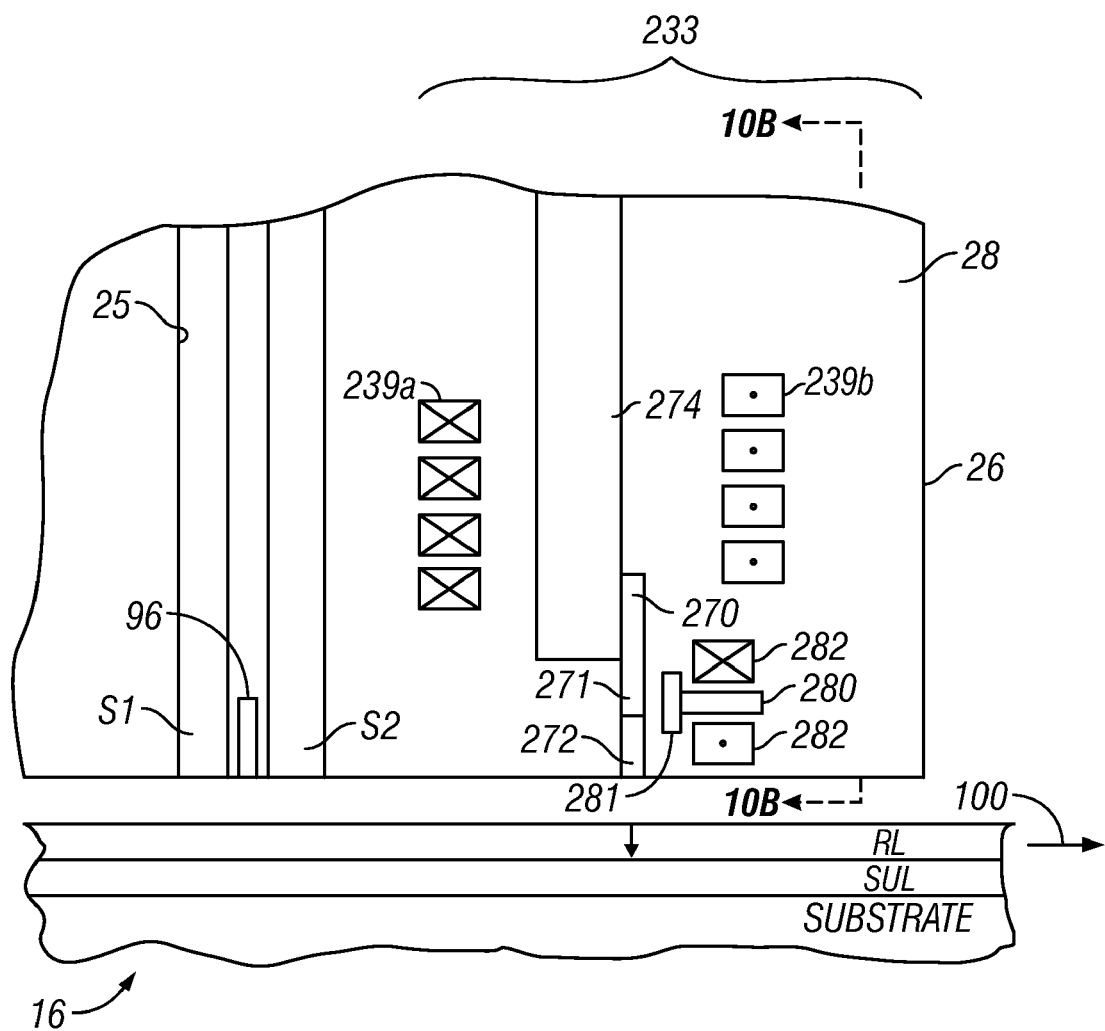
FIGS. 10A-10B show an embodiment of the write head according to the invention as a modification of the planar write head with helical coil shown in corresponding FIGS. 6A-6B.
Figure 10B:
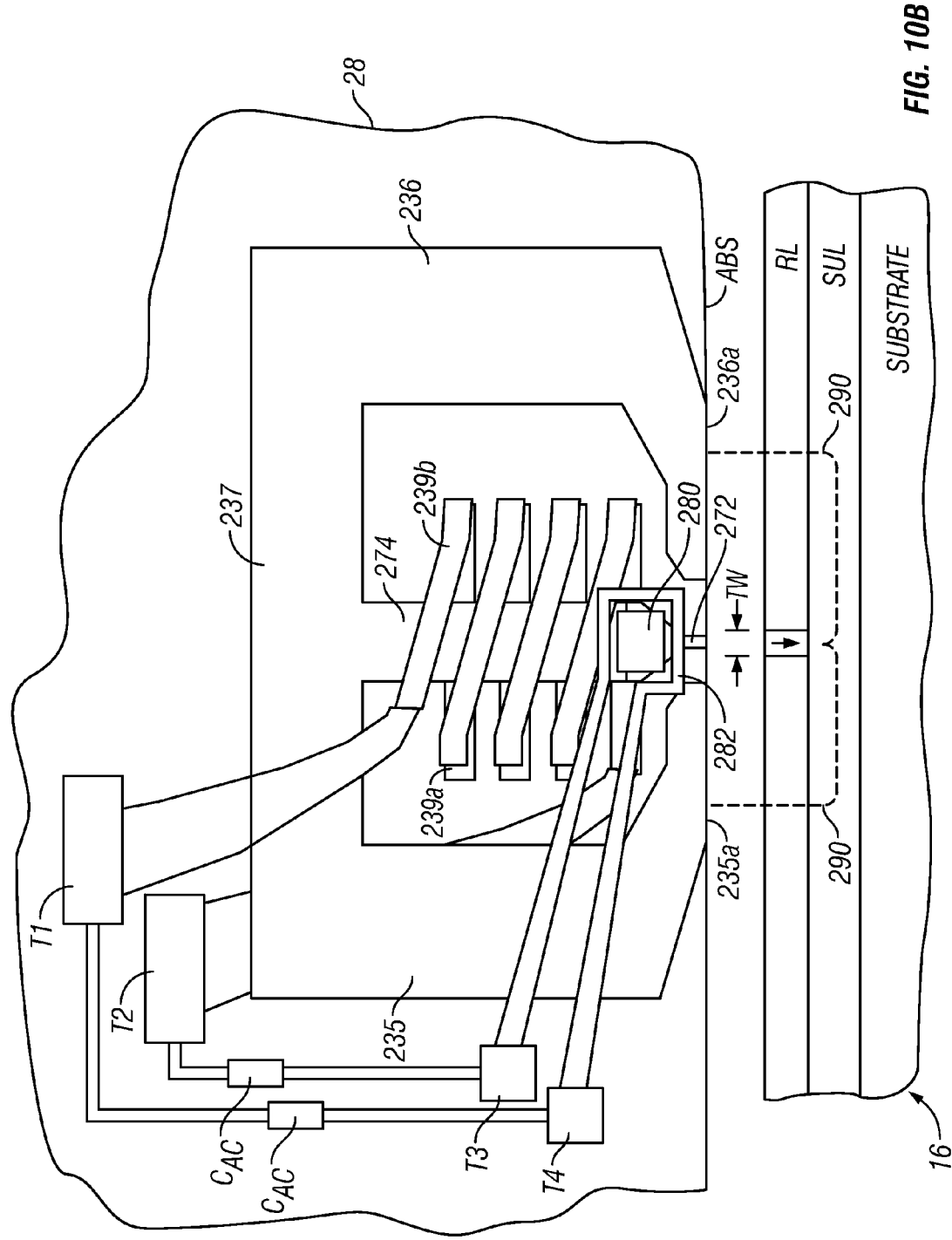

FIGS. 10A-10B show one embodiment of the write head of the invention as a modification of the planar write head with helical coil shown in FIGS. 6A-6B. In the side sectional view of FIG. 10A, an auxiliary pole 280 is formed with its longitudinal axis oriented preferably substantially orthogonal (70 to 90 degrees) to the primary axis of both main pole 274 and its attached WP 270. A single-turn auxiliary coil 282 is shown in section wrapped around auxiliary pole 280. The auxiliary coil 282 may also be a multi-turn coil. The auxiliary pole 280 may have an attached flux guide 281 that faces the WP 270 and assists in directing flux to WP 270. The auxiliary pole 280 and flux guide 281 may be formed of the same high-moment material used in conventional write poles, like WP 270. FIG. 10B is a view of the outer surface of slider 28 with protective alumina overcoat removed to show the underlying features of the write head of the invention. The auxiliary coil 282 is connected to terminals T3, T4 on slider 28. The main coil 239a, 239b is connected to terminals T1, T2 on slider 28. In FIG. 10B, the write head is depicted as connected to the embodiment of electrical circuitry wherein the auxiliary coil is energized by the high-pass filtered write signal, like that shown in FIG. 9A. Thus the two matched capacitors $C_{AC}$ that form the HPF are shown as being fabricated on the slider 28 and connected between T1 and T4, and T2 and T3, respectively.

Other embodiments of a write head with helical coil and auxiliary coil are also possible. For example, referring to the helical write coil depicted in FIG. 5, this structure can be modified by the addition of an auxiliary coil and auxiliary pole (like coil 282 and pole 280 with flux guide 281 in FIGS. 10A, 10B) between WP 70 and return pole 136.

While the electrical circuitry for generating the write current and auxiliary current has been described with respect to a planar write head with a helical coil and an auxiliary helical coil, as illustrated in FIGS. 10A-10B, the invention is not limited by a specific write head structure. Rather, the electrical circuitry may be implemented with any type of perpendicular write head having an auxiliary coil that generates write flux nonparallel to the write pole to facilitate the magnetization reversal of the write pole. These types of write heads include not only those with a helical coil, but also those with a pancake coil, like the head depicted in FIGS. 4A-4B.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording write system for magnetizing regions in a perpendicular magnetic recording layer comprising:
a write head comprising
a main pole;
a main electrically conductive coil coupled to the main pole for generating magnetic flux in the main pole;
an auxiliary pole; and
an auxiliary electrically conductive coil coupled to the auxiliary pole for generating magnetic flux in the auxiliary pole at an angle to the main pole greater than 15 degrees and less than or equal to 90 degrees;
a write driver capable of supplying write current in two directions to the main coil; and
circuitry coupled to the auxiliary coil for energizing the auxiliary coil when the write driver switches the direction of write current to the main coil.

2. The system of claim 1 wherein the auxiliary pole is oriented substantially orthogonal to the main pole.

3. The system of claim 1 wherein the main coil is a multiple-turn coil wherein all of the coil turns lie in substantially the same plane.

4. The system of claim 3 wherein the auxiliary coil is a helical coil wrapped around the auxiliary pole.

5. The system of claim 1 wherein the main pole has a ferromagnetic resonance frequency and the circuitry coupled to the auxiliary coil energizes the auxiliary coil to generate an auxiliary magnetic field at said ferromagnetic resonance frequency.

6. The system of claim 1 wherein the write driver generates a primary signal at the write frequency, and wherein the circuitry coupled to the auxiliary coil comprises an oscillator for applying an auxiliary signal at a frequency greater than the write frequency.

7. The system of claim 6 wherein the write driver is coupled to the oscillator, and wherein the phase of the auxiliary signal from the oscillator is matched to the phase of the primary signal from the write driver.

8. The system of claim 1 wherein the write driver generates a primary signal, and wherein the circuitry coupled to the auxiliary coil comprises a high-pass filter for filtering from said primary signal a high-frequency component corresponding to the current-direction switching of the write current.

9. The system of claim 8 wherein the high-pass filter comprises two matched capacitors in series with the auxiliary coil, the auxiliary coil being located between the two capacitors.

10. The system of claim 1 wherein the write current from the write driver has a magnitude $I_w$ and wherein the circuitry coupled to the auxiliary coil generates auxiliary current ($I_a$) having a magnitude greater than about 0.2 $I_w$.

11. A perpendicular magnetic recording write system for magnetizing regions in a perpendicular magnetic recording layer comprising:
a write head comprising
a main pole;
a main electrically conductive coil coupled to the main pole for generating magnetic flux in the main pole;
an auxiliary pole oriented substantially orthogonal to the main pole; and
an auxiliary electrically conductive coil coupled to the auxiliary pole for generating magnetic flux in the auxiliary pole;
a write driver for generating a primary signal to supply write current in two directions to the main coil; and
circuitry coupled to the auxiliary coil for energizing the auxiliary coil when the write driver switches the direction of write current to the main coil, the circuitry comprising a high-pass filter for filtering from said primary signal a high-frequency component corresponding to the current-direction switching of the write current.

12. The system of claim 11 wherein the main coil is a multiple-turn coil wherein all of the coil turns lie in substantially the same plane.

13. The system of claim 12 wherein the auxiliary coil is a helical coil wrapped around the auxiliary pole.

14. The system of claim 11 wherein the high-pass filter comprises two matched capacitors in series with the auxiliary coil, the auxiliary coil being located between the two capacitors.

15. The system of claim 11 wherein the write current from the write driver has a magnitude $I_w$ and wherein the circuitry coupled to the auxiliary coil generates auxiliary current ($I_a$) having a magnitude greater than about 0.2 $I_w$.

16. The system of claim 11 wherein the main pole has a ferromagnetic resonance frequency and wherein the frequency of said high-frequency component is said ferromagnetic resonance frequency.

* * * * *